United States Patent [19]

Fuentes

[11] Patent Number: 5,505,764
[45] Date of Patent: Apr. 9, 1996

[54] PROCESS FOR RESTARTING A RECEPTACLE FOR PURIFYING HYDROGEN BY ADSORPTION, AND ITS USE IN THE TREATMENT OF CERTAIN GASES CONTAINING HYDROGEN

[75] Inventor: François Fuentes, Paris, France

[73] Assignee: L'Air Liquide Societe Anonyme pour l'Etude et l'Exploitation des Procedes Georges Claude, Paris Cedex, France

[21] Appl. No.: 387,471

[22] Filed: Feb. 13, 1995

[30] Foreign Application Priority Data

Apr. 20, 1994 [FR] France .................................. 94 04706

[51] Int. Cl.⁶ .............................................. B01D 53/047
[52] U.S. Cl. ..................... 95/96; 95/121; 95/139; 95/140; 95/141
[58] Field of Search ............................. 95/96–103, 117, 95/121, 139–143, 148

[56] References Cited

U.S. PATENT DOCUMENTS

| | | | |
|---|---|---|---|
| 3,111,387 | 11/1963 | Avery et al. | 95/121 X |
| 3,212,236 | 10/1965 | Skarstrom et al. | 95/96 |
| 3,839,847 | 10/1974 | Banikiotes et al. | 95/96 |
| 3,866,428 | 2/1975 | Simonet et al. | 95/121 X |
| 4,077,779 | 3/1978 | Sircar et al. | 95/26 |
| 4,349,357 | 9/1982 | Russell | 95/26 |
| 4,375,363 | 3/1983 | Fuderer | 95/103 X |
| 4,469,665 | 9/1984 | Pinto | 95/121 X |
| 4,543,109 | 9/1985 | Hamlin et al. | 95/98 |
| 4,695,442 | 9/1987 | Pinto et al. | 95/96 X |
| 5,096,470 | 3/1992 | Krishnamurthy | 95/139 X |
| 5,154,736 | 10/1992 | Mifflin | 95/140 X |
| 5,198,001 | 3/1993 | Knebel et al. | 95/141 |
| 5,234,472 | 8/1993 | Krishnamurthy et al. | 95/140 X |

FOREIGN PATENT DOCUMENTS

| | | |
|---|---|---|
| 0367618 | 5/1990 | European Pat. Off. . |
| 0458350 | 11/1991 | European Pat. Off. . |

*Primary Examiner*—Robert Spitzer
*Attorney, Agent, or Firm*—Young & Thompson

[57] ABSTRACT

A process for restarting an adsorption receptacle which is part of an installation for the purification of hydrogen by pressure swing adsorption (PSA), which receptacle, during a hiatus in its operation, has been depressurized and then rendered inert with nitrogen. The receptacle is repressurized with practically pure hydrogen, and then the adsorption cycle is restarted in this receptacle. The repressurization is effected counter-current with respect to the adsorption direction in the receptacle. The receptacle is repressurized with hydrogen produced by the installation before the hiatus. The process can be used for the treatment of a catalytic hydrocarbon reforming gas, in which case the receptacle contains successively, in the adsorption direction, a layer of alumina, a layer of carbon and a layer of molecular sieve. Or the process can be used for the treating of a petroleum refinery residual gas, in which case the receptacle contains successively, in the adsorption direction, a layer of carbon with relatively large pores, a layer of carbon with relatively small pores and a layer of molecular sieve.

7 Claims, No Drawings

PROCESS FOR RESTARTING A RECEPTACLE FOR PURIFYING HYDROGEN BY ADSORPTION, AND ITS USE IN THE TREATMENT OF CERTAIN GASES CONTAINING HYDROGEN

The present invention relates to a process for restarting an installation for the purification of hydrogen by adsorption by pressure variation (PSA), which installation, during a hiatus in its operation, has been depressurized then rendered inert with nitrogen. It is applicable for example to the treatment of reforming gases with hydrocarbon vapor or residual gases from petroleum refineries.

The pressures herein are absolute pressures.

For reasons of safety, installations of the "PSA" (Pressure Swing Adsorption) type adapted to purify gases containing hydrogen must be depressurized and rendered inert with nitrogen when out of operation.

To restart the installation, it is necessary first to return the pressure of the receptacles in the adsorption phase to the high pressure of the adsorption cycle, which is the pressure or the charge or "feed".

To do that, the conventional technique consists of introducing into the receptacles in question the gas to be treated, first expanded, this introduction taking place in the so-called "co-current" direction, which is the direction of circulation in the receptacles during the adsorption phase.

In addition to the fact that this seems quite natural, because one anticipates in this way the adsorption phase without any changing of valves, there is thus avoided the injection of impurities to be eliminated in the outlet side of the receptacles. This is in any event imperative to avoid the pollution arising from the adsorption layer nearest this outlet, constituted by molecular sieve, by the heavy and/or aromatic hydrocarbons or by the water contained in the charge.

However, this conventional technique has serious drawbacks.

On the one hand, when the charge is introduced co-currently under a reduced pressure for repressurization, the adsorption of the impurities by the first layers of adsorbent is less effective, and as a result a portion of the impurities reaches the molecular sieve.

In particular, if the charge contains $CO_2$, which is the case for reforming gases with steam, it is necessary then to use numerous PSA cycles to desorb this $CO_2$ from the molecular sieve, which gives rise to a large loss of production, typically of the order of several hours. And if the charge contains heavy and/or aromatic hydrocarbons, which is the case for residual petroleum refinery gases, these substances cause irreversible pollution of the molecular sieve, thus progressively degrading, with each stopping, the performance of the installation.

The invention has for its object to minimize the duration of restarting installations for the purification of hydrogen of the PSA type while increasing the lifetime of their adsorbents.

To this end, the invention has for its object a process for restarting an installation for the purification of hydrogen by adsorption with pressure variation (PSA), which installation, during a hiatus in its operation, has been depressurized and then rendered inert with nitrogen, characterized in that at least one adsorption receptacle of the installation is repressurized with practically pure hydrogen, then the adsorption cycle is restarted in this receptacle.

Preferably, repressurization is effected counter-current relative to the adsorption direction in the receptacle.

The receptacle can for example be repressurized with the hydrogen produced by the installation before its stopping.

The invention also has for an object the use of such process on the one hand for the treatment of a reforming gas with hydrocarbon vapors, on the other hand, for the treatment of a petroleum refinery residual gas.

There will be described below two examples of operation of the invention.

EXAMPLE 1

There is treated by PSA adsorption a steam reforming hydrocarbon gas containing principally a mixture of $H_2/CO_2$ and, as minor impurities, CO, $CH_4$, $N_2$ and $H_2O$. The high pressure of the cycle is of the order of 20 to 30 bars. Each adsorption receptacle contains successively, in the adsorption direction, a layer of alumina, a layer of carbon and a layer of molecular sieve.

Upon stopping, these receptacles have been depressurized, generally counter-current, then filled with nitrogen under a low pressure of 2 to 3 bars.

With the conventional technique above for restarting, the charge is introduced co-currently, after expansion, into each receptacle to be placed in adsorption phase. The water is stopped by the alumina, but the $CO_2$ reaches the molecular sieve. Before resuming production, it is necessary to ensure the desorption of the $CO_2$ by PSA.

For an installation having a nominal production capacity of 10,000 $Nm^3/h$ of hydrogen, the duration of this preliminary desorption is about 1 hour, which corresponds to a loss of production of about 10,000 $Nm^3$ of hydrogen.

With the technique of the present invention, the counter-current repressurization of the receptacles with practically pure hydrogen consumes 1,000 $Nm^3$ of hydrogen and last 15 minutes, which corresponds to a production loss of 2,500 $Nm^3$ of hydrogen. The total hydrogen loss is therefore 1,000+2,500=3,500 $Nm^3$ of hydrogen.

Comparing these two processes, it will be seen that the process of the invention permits obtaining an overall gain of hydrogen product of 6,500 $Nm^3$ for each restarting.

EXAMPLE 2

A petroleum refinery residual gas is treated by PSA adsorption, containing 60 to 90% $H_2$, the rest being $C_xH_y$ impurities, including heavy hydrocarbons and aromatic hydrocarbons. The high pressure of the cycle is of the order of 30 bars. Each adsorption receptacle contains successively, in the adsorption direction, a layer of carbon with large pores, carbon with small pores, and a layer of molecular sieve.

During one hiatus, again, the receptacles have been depressurized, generally counter-current, then filled with nitrogen under a low pressure of 2 to 3 bars.

With the recited conventional technique, a portion of the heavy and aromatic hydrocarbons reaches the molecular sieve and irreversibly pollutes it. Moreover, to eliminate the impurities, particularly ethane, which pollute the molecular sieve irreversibly during repressurization, it is necessary to effect numerous cycles of PSA desorption.

For an installation having a nominal production capacity of 10,000 $Nm^3/h$ of hydrogen, the duration of this preliminary desorption is about 2 hours, which corresponds to a loss of production of about 20,000 $Nm^3$ of hydrogen.

With the technique of the present invention, the counter-current repressurization of the receptacles by practically pure hydrogen consumes 1,700 Nm$^3$ of hydrogen, and lasts 15 minutes, which corresponds to a loss of production of 2,500 Nm$^3$ of hydrogen. The total hydrogen loss is therefore 1,700+2,500=4,200 Nm$^3$ of hydrogen.

Comparing the two procedures, it will be seen that the procedure of the invention permits achieving an overall gain of 15,800 Nm$^3$ of hydrogen product each restarting, and this without deteriorating the molecular sieve.

As will be seen, the consumption of pure hydrogen involved in the process of the invention is very greatly compensated by the large decrease of the duration of restarting. This is due to the absence of impurities injected at low pressure, this absence rendering possible the counter-current repressurization, which gives rise to the return toward the inlet of the receptacles of the impurity front not desorbed during stopping.

In each use, the practically pure hydrogen used for repressurization before restarting can be withdrawn from a distribution network or from receptacles for handling hydrogen. In particular, it is generally a matter of hydrogen produced by the installation itself before the stopping in question.

I claim:

1. In a process for restarting an adsorption receptacle which is part of an installation for the purification of hydrogen by pressure swing adsorption (PSA), which receptacle, during a hiatus in its operation, has been depressurized and then rendered inert with nitrogen; the improvement comprising repressurizing the receptacle with substantially pure hydrogen, and then restarting an adsorption cycle in this repressurized receptacle.

2. Process according to claim 1, wherein the repressurization is effected counter-current with respect to the direction in which hydrogen to be purified moves through the receptacle.

3. Process according to claim 1, wherein said repressurizing of the receptacle is conducted with hydrogen produced by the installation before said hiatus.

4. Process according to claim 1, wherein the hydrogen to be purified is a catalytic hydrocarbon reforming gas.

5. Process according to claim 4, wherein the receptacle contains successively, in the direction in which hydrogen to be purified moves through the receptacle, a layer of alumina, a layer of carbon and a layer of molecular sieve.

6. Process according to claim 1, wherein the hydrogen to be purified is a petroleum refinery residual gas.

7. Process according to claim 6, wherein the receptacle contains successively, in the direction in which hydrogen to be purified moves through the receptacle, a layer of carbon with relatively large pores, a layer of carbon with relatively small pores and a layer of molecular sieve.

* * * * *